May 10, 1927.
R. R. BLOSS
1,628,571
BEARING
Filed Dec. 10, 1923
2 Sheets-Sheet 1
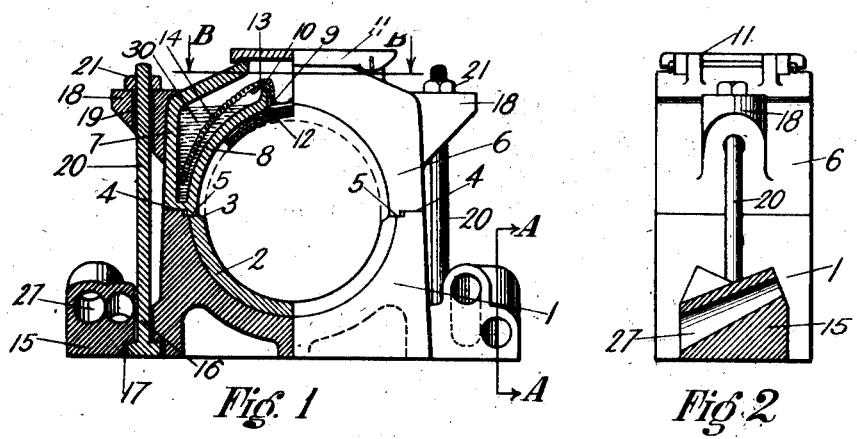
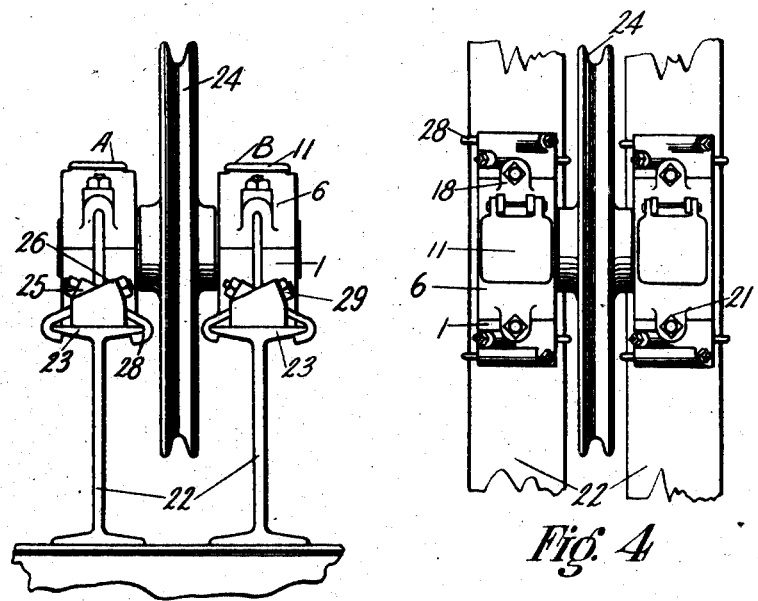
RICHARD R. BLOSS INVENTOR.
BY
ATTORNEY.

May 10, 1927.

R. R. BLOSS

BEARING

Filed Dec. 10, 1923

RICHARD R. BLOSS.
INVENTOR.

BY

ATTORNEY.

Patented May 10, 1927.

1,628,571

UNITED STATES PATENT OFFICE.

RICHARD R. BLOSS, OF COLUMBUS, OHIO, ASSIGNOR TO THE INTERNATIONAL DERRICK & EQUIPMENT COMPANY, OF COLUMBUS, OHIO, A CORPORATION OF OHIO.

BEARING.

Application filed December 10, 1923. Serial No. 679,612.

My invention relates to bearings and, more particularly, to adjustable bases for bearings which provide great flexibility in installation and adjustment.

My invention has to do with bearings which are adapted to be carried upon suitable supports and are adjustable thereon. One of the main objects of my invention is to provide a bearing wherein maximum ease and simplicity in installation is provided and wherein a wide range of adjustment with reference to its support may be accomplished.

Another object of my invention is to provide a bearing which may be attached to its support without the drilling of holes in the support, or otherwise distorting or marring the support, whereby the maximum strength of the support is maintained. This feature eliminates aligning of holes in the bearing base with holes in the bearing support.

There may be instances when it is necessary for the faces of the opposed bearings to remain in a fixed or constant distance apart regardless of the varying of the distance between the bearing supports. Another object of my invention is to provide for this feature. In other words, the use of my invention enables the spacing between the bearing supports to be varied, while maintaining the spacing between the faces of the bearings constant; or my invention permits the spacing between the faces of the opposed bearings to be varied or to remain constant independently of spacing between the respective bearing supports.

There may also be instances where the supporting surface of the bearing supports varies in width, and still another object of my invention is to provide means for attaching the bearing base to its support regardless of the width of the bearing base support. This may be done without the drilling of any holes or in any way marring, distorting or weakening the bearing support. A further object of my invention is to provide means whereby the bearing may be set upon its support at any angle with respect to the longitudinal axis of its respective support. In other words, my invention provides for the placing of the shaft, carried by the bearing, at any position along the longitudinal axes of the bearing supports. In this respect, my invention provides means whereby the bearings can be adjusted to any position and at any angle with respect to the longitudinal axes of the bearing supports without the necessity of punching holes in the supports, thereby providing a bearing readily accessible and easy to adjust, at the same time eliminating the necessity of making a varying number of holes in the bearing support in order to apply the bearing to the variable positions above referred to.

Other objects and advantages of my invention will become apparent by reference to the specification following hereafter and by inspection of the drawings annexed hereto.

My invention may be applied to any bearing which is carried upon a separate supporting means. However, in order to fully explain and describe my invention, I have chosen a form of structure as applied to bearings for carrying a pulley, such as that known as the crown pulley in drilling rig structures.

The form of structure which I have chosen to illustrate my invention is shown in the accompanying drawings, wherein, Figure 1 is a side view, partly in section, of a structure employing my invention. This view illustrates a part of the internal portion of the bearing showing the relative position of its parts and the lubricating means cooperating with such operating parts.

Figure 2 is an end view of the bearing with a portion of the bolting flange boss shown in section.

Figure 3 shows my invention employed in securing the bearings to I-beam supporting members.

Figure 4 is a plan view of the structure shown in Figure 3, illustrating the bearings arranged in parallelism with the bearing supports.

Figure 6 is a view of a portion of the structure similar to that shown in Figure 5 but illustrating the manner in which the spacing between the supporting members may be varied without varying the spacing between the adjacent faces of the bearings.

Figure 7:
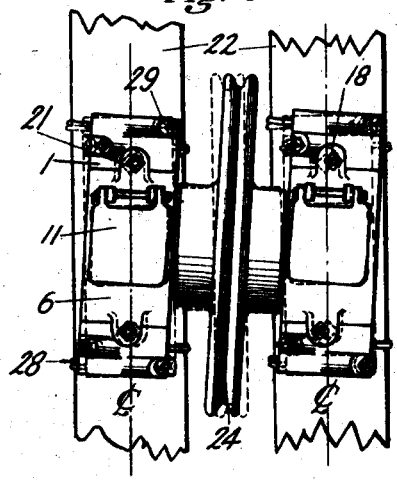

Figure 7 is a plan view of a structure similar to that shown in Figure 4 but illustrating the manner in which the bearings, or either of them, may be set at varying angles with respect to the longitudinal axis of the respective supporting member.

Figure 8:
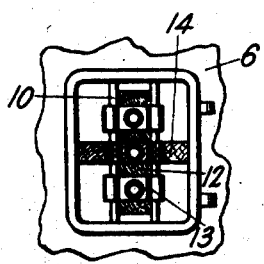

Figure 8 is a view taken on line B—B of Figure 1.

In the drawings, my invention is shown as comprising a bearing base 1, with a lining as at 2, and having the edges of the said lining beveled as at 3 to aid in keeping a supply of oil on the shaft adapted to bear and be supported upon the lining 2, assisting in lubrication thereof. The bearing base 1 is provided with upstanding ledges 4 paralleling the shaft bearing, such ledges 4 being adapted to co-act with depending ledges 5 of the bearing cap 6, the entire bearing as a unit being held in parallel relation to the shaft to be carried thereby. In the structure shown, the shaft to be used requires a bearing surface only in its lower side since all of its forces are in a downward direction. The bearing cap 6 is provided with an outer wall 7 and an inner wall 8, as shown in Figure 1, of the drawing to form a lubricant reservoir 30. The inner wall 8 is arranged concentrically with relation to the shaft and is spaced an appreciable distance from the shaft. The upper edges of this inner wall 8 are broken so as to form an open space 9 at the top, the opening being formed by the flanges 10 of the inner wall as shown in Figure 1. This opening 9 leads from the lubricant reservoir 30, to the shaft carried by the lining 2. The upper portion of the outer wall terminates in an opening which is covered by the lid 11. The reservoir 30 is adapted to carry a lubricant and the opening covered by the lid 11 is provided for the purpose of supplying the lubricant to the said reservoir and for cleaning out same and the like.

Referring particularly to Figures 1 and 8, in order to feed the lubricant from the reservoir to the shaft, I provide means comprising a felt pad 12 which is carried by and secured to a clip member 13, preferably, by riveting the pad thereto. This clip member 13 is so shaped that it will snap or hook over the upstanding flanges 10 of the inner wall and remains in place without the possibility of the felt pad 12 being displaced, curled or wrinkled. As shown in Figure 8, a wick member 14 or plurality of wick members, as desired, is secured to the felt pad 12, preferably, by riveting. The wick member 14 is of such length that it will extend up over the upstanding parallel flanges 10 and down into the lubricant in the lubricant reservoir 30. The felt pad 12, preferably, is of such thickness and so located that it will contact with the shaft to be carried by the lining 2.

With this construction, due to capillary attraction, the lubricant in the cavity between the walls 7 and 8 is carried through the wick or wicks 14 to the felt pad 12. This lubricant is carried to the felt pad 12 until a state of saturation is effected. Thus it is obvious that the lubricant is automatically supplied to the shaft and its bearing at only those times when required; because, when the shaft is rotating and the maximum amount of lubricant is required, the shaft is constantly carrying the lubricant away from the felt pad 12 and when the shaft is stopped and the point of saturation of pad 12 is reached, the feeding of the lubricant ceases. This construction eliminates waste of the lubricant.

In the oiling construction above described, there may be instances where larger or smaller bearings may be used or where, due to the nature of the work required, a greater amount of lubricant is necessary. In my structure, I have provided means for taking care of any such varying conditions by the arrangement of the parts shown, whereby it will be seen that the amount and rate of supply of lubricant to the pad member 12 is directly dependent upon the size and the nature of the wick or wicks 14; that is to say, larger or smaller wicks may be used, and the quality of the wick changed, as the circumstances require. Although I employ a felt pad 12, it is to be understood that the pad 12 may be of any suitable and desired material.

The oiling means, described above, is easily accessible, is simple in construction and easy to manipulate and greatly facilitates installation and repairs. This is better emphasized by the fact that the oiling wicks and pad are removable as a unit by merely opening lid 11 and removing the clips 13. Another very great advantage lies in the fact that foreign particles in the oil do not readily clog or retard the oil flow. This permits of the use of low grades of oil or salvaged oil containing sediment etc. The above means which I provide for oiling the bearing is very economical in that it reduces the amount of lubricant used to only that amount required under the circumstances and feeds the lubricant only at the time required and needed.

The bearing base 1 is extended horizontally at the bottom, as at 15, and is provided with openings 16 having counter-sunk portions 17. The bearing cap is also provided with horizontally extending lugs 18 which are provided with openings 19 adapted to align with openings 16 in the bearing base. The bearing base 1 and cap 6 are held rigidly together in longitudinal alignment by bolts 20 which are passed through the openings 16 and 19 in the base and cap respectively, the bolts being tightened up and held in place by the nuts 21.

In the structure that I have chosen to illustrate my invention, I employ I-beams 22 (Figs. 3 and 7 inclusive) which serve as bearing supports, the upper flanging portion 23 of the beam being employed as the bearing base supporting surface. In the drawings, I have shown two bearings arranged in parallelism and carrying a shaft which in turn carries the pulley 24. This pulley 24 may be put to various uses, an example of it would be a crown pulley as used in a drilling rig structure.

Figure 5:
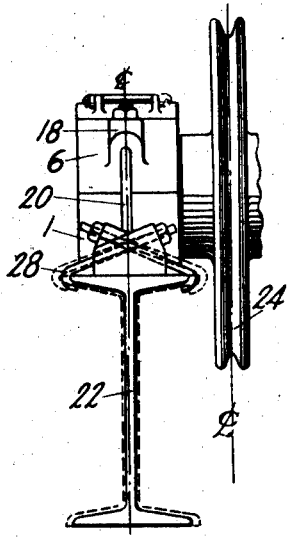
Figure 5 is a fragmental view of a structure employing my invention and illustrating the application of the bearing employing my invention to bearing supports of varying supporting widths. The dotted and full lines illustrate supporting members of varying sizes.
Figure 6:
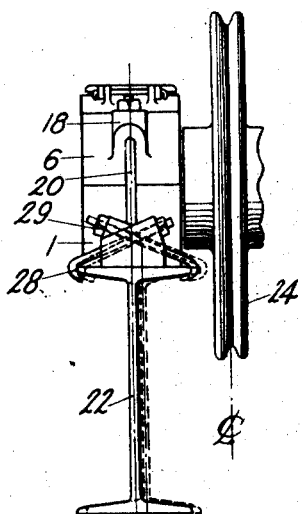

It is well known that bearings, of the type shown, may be used under varying conditions in the same installation or one certain bearing or set of bearings may be used in different installations wherein the size, shape or alignment of the supporting surface may vary. For example, the bearing may be applied to a wider or narrower supporting surface of the same or different shape or the bearing may be moved longitudinally of the support or moved laterally of the support, or the support may be moved closer together or farther apart or the bearing may be adjusted with an angular relation to the longitudinal axis of the support. With the use of the ordinary bearing structures, such as those that are removably carried upon a support, the above conditions require the drilling of new holes in the support or supports, or the supporting surfaces must originally be provided with a varying number and series of openings for the insertion of bolts or the like for securing the bearing base to its support to provide for such conditions to insure interchangeability. Also, such an arrangement as this requires that both the bearing and the bearing support be disturbed and alignment effected, causing considerable trouble and difficulty in installation or repair work and resulting many times in improper alignment of the bearing parts which cause excessive wear et cetera. In my invention I overcome the difficulty encountered in the above circumstances by employing a bearing structure which is adapted to be adjusted to any position relative to its support or which permits the support to be adjusted to any position without disturbing the fixed position of the bearing. In other words, my invention provides for the adjustment of the bearing upon its support to any predetermined and desired position or permits the adjustment of the bearing support to any position without disturbing and removing or disfiguring either the bearing itself or the bearing support. The means which I have provided for carrying out my invention may comprise the angularly disposed bosses 25 and 26 as shown in Figs. 3, 5 and 6, which are located on the extended portion 15 of the bearing base 1.

The bosses 25 and 26 are each provided with holes 27 of any desirable shape for passing therethrough clamping bolt means of selected shapes. These holes 27 are angularly opposed and are criss-crossed one with respect to the other. Each end of the bearing base, at its horizontally extended portion, is provided with a pair of these bosses 25 and 26 and holes 27 as shown in Figs. 1 and 4. Each of the holes 27 is adapted to receive a suitably shaped clamp bolt 28 which is bent or formed at one end to hook over or otherwise engage the bearing supporting surface such as the I-beam flanges 23 shown in the drawings. The opposite end of each clamp bolt is threaded to receive an adjusting nut 29. In assembling each clamp bolt 28 is thrust through the hole 27 in its respective boss so that the hook or support engaging end hooks over or otherwise engages the bearing supporting surface. Each nut 29 is then applied and tightened up to suit the desired adjustment. With all of the clamp bolts 28 applied, suitably adjusted, and tightened, the bearing, as an entirety, is held rigidly and securely upon its support.

It is desirable that the adjacent faces of the opposite bearings, such as bearings A and B shown in Fig. 3, be held in a predetermined parallel alignment one with respect to the other in order to provide the desired bearing surface without undue restriction and wear. In employing my invention, the adjacent faces of the opposite bearings can be positively adjusted so as to have an accurate parallel relation by merely adjusting and manipulating the clamp bolts 28 and their respective adjusting nuts 29. This can be readily effected with my invention without removing the bearing base 1 from its support 23 and without in any way distorting the support 23. For example, when it is desired to install the bearings A and B (Fig. 3) with their adjacent faces in parallel relation, the adjusting nuts 29 on the clamp bolts 25 and 26 are loosened and tightened respectively so as to swing the respective end of the bearing in either direction as desired. This adjustment can take place at either end of the bearing as occasion requires.

Furthermore, my invention provides for ready adjustment under circumstances where a certain bearing or set of bearings is being employed in a certain installation on one set of supports and it becomes necessary to apply this same bearing or set of bearings to another support in the same or different installation, the supporting surface of the new support being wider or narrower. As shown in Fig. 5 of the drawings, this condition is readily taken care of by merely reapplying the clamps 28 as previously described, the only difference being that the nuts 29 may be tightened up more or less on the respective clamp bolts to bring about the proper adjustment and securement of the bearing to its support. In applying the clamp bolts 28 to wider or narrower supporting surfaces, the angle of the bolt changes to a degree dependent upon the change in width of the support. To take care of this variation, I form the clamp bolt holes 27 with an enlarged bottom portion. This enlarged portion of the bolt holes 27 also compensates for any other change in angularity of the clamp bolts caused by moving the same.

Another advantage in the use of my invention is in the case of the use of a pulley 24 as shown where a pulley shoulder to shoulder dimensions of predetermined amount is employed and where it is desirable that the bearing base give support to the pulley trunnion over its entire length; that is to say, where it is desirable to maintain the distance between the faces of the bearings, the same as the distance between the faces of the pulley hub structure. Although it is desirable to maintain this condition between the faces of the bearings, it becomes desirable, at times, to change the spacing between the bearing supports. My invention meets the above conditions by providing means such as the adjustable clamp bolts 28, whereby the bearing supports may be moved closer together or farther apart without changing the predetermined fixed spacing between the adjacent bearing faces and without removing the bearings from their supports or in any way distorting the bearing supports. This feature of my invention is illustrated in Fig. 6 of the drawings. In Fig. 6, the solid lines show the bearings support, in its original position while the dotted lines show it in position after the supports have been moved closer together, the spacing between the adjacent faces of the opposite bearings remaining constant. In this instance the change is made by merely loosening the nut 29 on the clamp bolt 25 and tightening the nut on the clamp bolt 26 after the support has been moved over. When the supports are moved further apart, the manipulation and the adjusting of the clamp bolts 28 is just opposite to that above described, the ultimate effect being the same.

There will be instances when it is desired to adjust the bearings at an angle to the longitudinal axes of the supporting members instead of parallel therewith. An example of this is in the case of the use of a pulley 24, as shown, where it is necessary to adjust the pulley at various angles to accommodate the angularity of the cable or rope to be used over the pulley. I have demonstrated the application of my invention to such a circumstance in Fig. 7 of the drawings. The result shown in Fig. 7 is obtained by loosening and tightening the nuts 29 on the respective clamp bolts 25 and 26 for both bearings A and B to the desired extent dependent upon the angle at which the bearing is to be turned. With my bearing clamping arrangement, both bearings may be readily turned at the desired angle and quickly adjusted in parallelism without difficulty and without removing the bearings from their supports or in any way distorting the supports.

It will be understood that while I have shown my invention as applied to an I-beam supporting structure and a pulley bearing structure, I do not limit my invention to such, since it may be applied to various supporting structures of various shapes and sizes by making a corresponding change in shape and size in the attaching portion of the clamp bolts, this being done without, in any way, departing from the scope of my invention.

From the foregoing description and by inspecting the drawings, it will be seen that my invention provides a neat, compact, simple and exceedingly flexible adjustable bearing structure, wherein a wide range of adjustment with respect to this support may be accomplished. It will also be seen that my invention provides a varying adjustable bearing which may be applied to its support without the drilling of holes or in any other manner distorting the support, whereby the maximum strength of the support is at all times maintained. My structure, furthermore, simplifies installation and repair by eliminating the necessity of drilling holes and lining up the same.

Another advantage of my invention is the provision for the changing of the position and spacing relation of the bearing supports without changing the position and spacing relation between the adjacent faces of the bearings. This is also accomplished without, in any way, distorting or marring the supporting members. Also, it will be seen that my invention provides for the use of a certain bearing in varying installations regardless of the width of the new supporting members. In other words, my invention reduces the cost of up-keep and installation by providing for interchangeability. Still another and important feature of my invention, as amplified by the foregoing description, is, that it enables the bearing to be readily adjusted upon its support at any desired angle with respect to the longitudinal axis of the support, this being accomplished without removing the bearing from its support or distorting, marring, or otherwise changing the support itself. It is also obvious that my invention provides for vertical adjustment of each bearing relative to its support.

Having thus described my invention, my claim is:

1. In a journal bearing, a bearing base, comprising horizontally flanging portions at its bottom, integral and angularly disposed bosses carried by said flanging portions and angularly opposed openings in said bosses for carrying clamping means for securing said base to a supporting member.

2. In combination with a journal bearing, means for connecting such bearing to its support comprising fastening members arranged in criss-cross relation with respect to each other for securing the said bearing to its support without the use of bolt holes in the said support.

3. In combination with a journal bearing, means for connecting such bearing to its support comprising fastening members arranged in criss-cross relation with respect to each other for securing the said bearing to its support without the use of bolt holes in the said support, whereby the said bearing can be moved to and secured in any position on said support without new bolt holes or removing the said bearing from said support.

4. In combination with a journal bearing, fastening means for connecting such bearing to a support comprising a bearing base having spaced pairs of angularly opposed bosses integral therewith, said bosses having opposed and criss-crossed openings therethrough, and fastening members adapted to pass through said openings in criss-cross relation for connecting the said bearing to the said support.

5. In combination with a journal bearing, fastening means for connecting such bearing to a support comprising a bearing base having spaced pairs of angularly opposed bosses integral therewith, said bosses having opposed and criss-crossed openings therethrough, and fastening members adapted to pass through said openings in criss-cross relation for connecting the said bearing to the said support without the use of bolt holes.

6. In combination with a journal bearing, fastening means for connecting such bearing to a support comprising a bearing base having spaced pairs of angularly opposed bosses integral therewith, said bosses having opposed and criss-crossed openings therethrough, and fastening members adapted to pass through said openings in criss-cross relation for connecting the said bearing to the said support without the use of bolt holes, whereby said bearing can be moved to any position on said support without new bolt holes.

7. In combination with a journal bearing, fastening means for connecting such bearing to a support comprising a bearing base having spaced pairs of angularly opposed bosses integral therewith, said bosses having opposed and criss-crossed openings therethrough, and fastening members adapted to pass through said openings in criss-cross relation for connecting the said bearing to the said support without the use of bolt holes, whereby said support can be moved to any position relative to the said bearing without new bolt holes.

In testimony whereof I hereby affix my signature.

RICHARD R. BLOSS.